United States Patent
Ogawa

(10) Patent No.: US 7,136,237 B2
(45) Date of Patent: Nov. 14, 2006

(54) OPTICAL SYSTEM

(75) Inventor: Hideki Ogawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 10/994,359

(22) Filed: Nov. 23, 2004

(65) Prior Publication Data

US 2005/0128599 A1 Jun. 16, 2005

(30) Foreign Application Priority Data

Dec. 16, 2003 (JP) .............................. 2003-417974

(51) Int. Cl.
 G02B 9/04 (2006.01)
 G02B 3/00 (2006.01)
(52) U.S. Cl. ...................... 359/795; 359/642
(58) Field of Classification Search ................ 359/642, 359/745, 746, 747, 748
 See application file for complete search history.

(56) References Cited

U.S. PATENT DOCUMENTS

| | | | |
|---|---|---|---|
| 4,241,983 A | 12/1980 | Kitagishi | 359/746 |
| 4,348,084 A | 9/1982 | Kitagishi et al. | 350/745 |
| 4,435,049 A | 3/1984 | Horikawa et al. | 359/745 |
| 4,857,487 A | 8/1989 | Broemer et al. | 501/44 |
| 4,913,535 A | 4/1990 | Robb | 359/665 |
| 4,915,721 A | 4/1990 | Broemer et al. | 65/66 |
| 5,528,427 A | 6/1996 | Tanaka et al. | 359/683 |
| 5,537,259 A | 7/1996 | Ogawa | 359/684 |
| 5,568,321 A | 10/1996 | Ogawa et al. | 359/676 |
| 5,629,799 A | 5/1997 | Maruyama et al. | 359/565 |
| 5,790,321 A | 8/1998 | Goto | 359/742 |
| 5,930,043 A | 7/1999 | Ogawa | 359/566 |
| 6,115,188 A | 9/2000 | Nishio et al. | 359/690 |
| 6,124,981 A | 9/2000 | Ogawa | 359/675 |
| 6,381,079 B1 | 4/2002 | Ogawa | 359/795 |
| 6,912,092 B1* | 6/2005 | Ukuda | 359/642 |
| 7,057,831 B1* | 6/2006 | Ogawa | 359/795 |
| 2005/0168841 A1* | 8/2005 | Ogawa | 359/795 |
| 2005/0243434 A1* | 11/2005 | Endo | 359/642 |
| 2005/0243436 A1* | 11/2005 | Yasui | 359/676 |
| 2005/0243438 A1* | 11/2005 | Hamano et al. | 359/692 |
| 2005/0275947 A1* | 12/2005 | Nishio | 359/642 |

FOREIGN PATENT DOCUMENTS

| | | |
|---|---|---|
| EP | 0 950 911 | 10/1999 |
| JP | 60-49883 B2 | 11/1985 |
| JP | 60-55805 B2 | 12/1985 |
| JP | 62-100452 | 5/1987 |
| JP | 6-324262 | 11/1994 |
| JP | 6-331887 | 12/1994 |
| JP | 11-119092 | 4/1999 |

OTHER PUBLICATIONS

Apr. 6, 2005 Search Report in EP 04257489.
Mar. 17, 2006 Chinese Official Action (with English-language translation).

* cited by examiner

*Primary Examiner*—David N. Spector
(74) *Attorney, Agent, or Firm*—Fitzpatrick, Cella, Harper & Scinto

(57) ABSTRACT

Provided is an optical system, in which various aberrations including chromatic aberrations are preferably corrected and which is easily manufactured and has a superior environmental resistance, comprising a solid material (GIT1) having two surfaces both on a light incident side on a light exit side being refractive surfaces, in which following conditional expressions are satisfied:

$$\nu d < 30,$$

$$\theta gd < -3.333 \times 10^{-3} \cdot \nu d + 1.40,$$

$$\theta gF < -2.615 \times 10^{-3} \cdot \nu d + 0.67,$$

where $\nu d$ represents an Abbe number of the solid material and $\theta gd$ and $\theta gF$ represent partial dispersion ratios thereof.

8 Claims, 8 Drawing Sheets

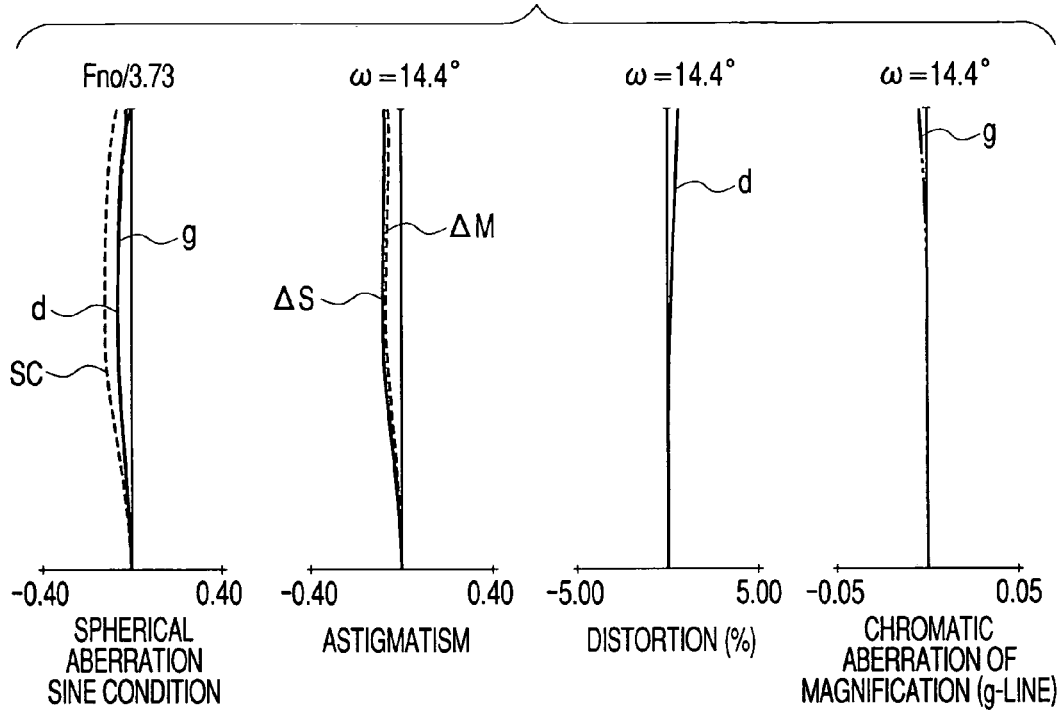
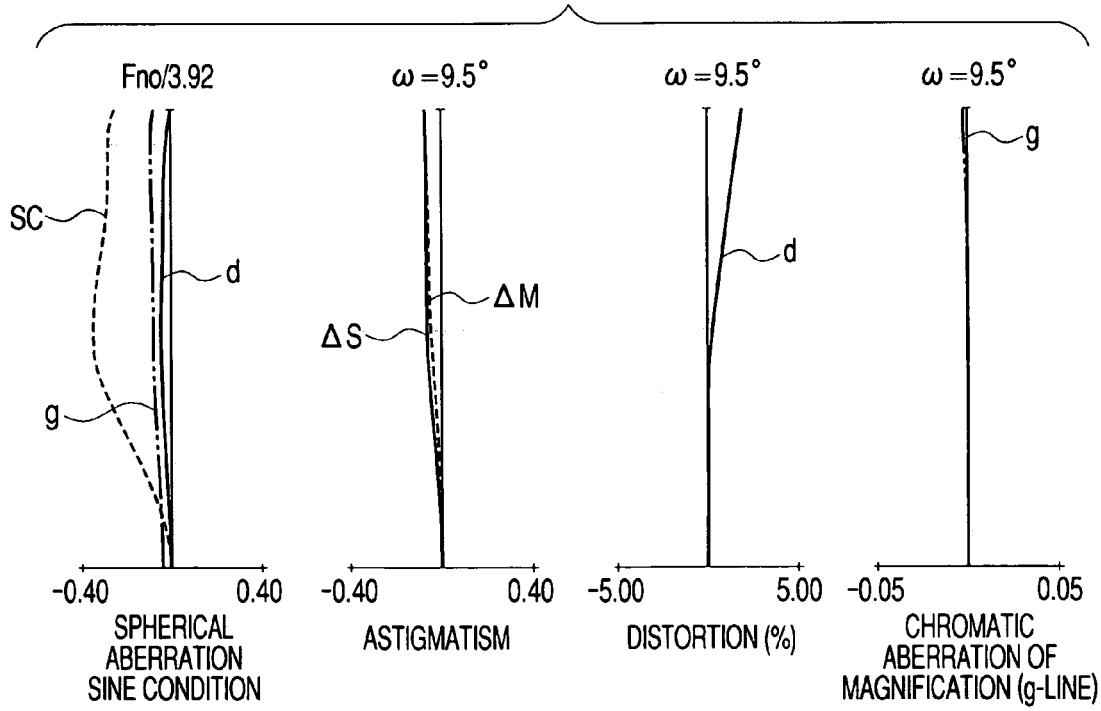

OPTICAL SYSTEM

BACKGROUND OF THE INVENTION

1. Field of the Invention

The present invention relates to an optical system using an optical material having extraordinary partial dispersion, and more particularly to an optical system suitable for a silver halide film camera, a digital still camera, a video camera, or the like.

2. Related Background Art

In general, chromatic aberrations such as longitudinal chromatic aberration and chromatic aberration of magnification, of an optical system deteriorate as the entire length of the optical system shortens, so that an optical performance thereof is likely to reduce. In particular, in the case of a telephoto type optical system, the chromatic aberrations increase as a focal length lengthens. Therefore, the chromatic aberrations significantly deteriorate with shortening of the entire length.

Achromatization using an extraordinary partial dispersion material and achromatization using a diffraction grating have been generally known as methods of reducing such chromatic aberrations.

In the telephoto type optical system, the chromatic aberrations are generally reduced by a front lens unit, in which a passing position of a paraxial on-axis ray and a passing position of a pupil paraxial ray from the optical axis become relatively high, including a positive lens made of a low dispersion material having extraordinary partial dispersion such as fluorite and a negative lens made of a high dispersion material. Such various telephoto lenses have been proposed (Japanese Patent Publication No. S60-049883 (corresponding to U.S. Pat. No. 4,241,983 B), Japanese Patent Publication No. S60-055805 (corresponding to U.S. Pat. No. 4,348,084 B), and Japanese Patent Application Laid-Open No. H11-119092 (corresponding to U.S. Pat. No. 6,115,188 B)).

A telephoto lens in which the chromatic aberrations are corrected using not an extraordinary partial dispersion material but a diffraction optical element has been also proposed. A telephoto lens having an F number of about F2.8 in which the chromatic aberrations are relatively preferably corrected by a combination of a diffraction optical element and a refractive optical element has been disclosed in Japanese Patent Application Laid-Open No. H06-324262 (corresponding to U.S. Pat. No. 5,790,321 B) and Japanese Patent Application Laid-Open No. H06-331887 (corresponding to U.S. Pat. No. 5,629,799 B).

With respect to features of the diffraction optical element, an absolute value of a numerical value corresponding to an Abbe number is a small value of 3.45. The chromatic aberrations can be significantly changed without substantially causing an influence on spherical aberration, coma, astigmatism, and the like by slightly changing optical power (the reciprocal of a focal length) due to diffraction. Because of diffraction light, the optical power linearly changes in accordance with a change in frequency of incident light, so that a wavelength characteristic of a chromatic aberration coefficient becomes perfectly linear. Therefore, when the entire length is shortened, the spherical aberration, the coma, and the astigmatism may be particularly corrected in aberration correction. Since the chromatic aberrations are corrected by the diffraction optical element, glass materials constituting lenses and optical powers may be suitably designed so as to obtain the linearity of the wavelength characteristic of the chromatic aberration coefficient without concern for an absolute amount of the chromatic aberrations deteriorated by shortening of the entire length. As a result, the telephoto lens whose entire length is shortened can be obtained.

A liquid material whose characteristic includes relatively high dispersion and relatively extraordinary partial dispersion has been known as a material having a chromatic aberration correction function similar to that of the diffraction optical element, and an achromatization optical system using the liquid material has been proposed (U.S. Pat. No. 4,913,535 B).

According to the telephoto lenses using fluorite or the like as described in Japanese Patent Publication No. S60-049883 (corresponding to U.S. Pat. No. 4,241,983 B), Japanese Patent Publication No. S60-055805 (corresponding to U.S. Pat. No. 4,348,084 B), and Japanese Patent Application Laid-Open No. H11-119092 (corresponding to U.S. Pat. No. 6,115,188 B), when the entire optical length is set to a relatively long length, it is possible to relatively preferably correct the chromatic aberrations. However, it is hard to correct the deterioration of chromatic aberrations due to shortening of the entire length. This is because such a method is used to merely reduce the chromatic aberrations caused in a front lens itself (lens closest to a subject) using the low dispersion and extraordinary partial dispersion of a material such as fluorite. When the chromatic aberrations deteriorated due to shortening the entire length are intended to be corrected by, for example, a lens made of low dispersion glass having a large Abbe number, such as fluorite, since it is necessary to significantly change optical power of a lens surface in order to change the chromatic aberrations, it is difficult to satisfy both the corrections of the chromatic aberrations and the corrections of various aberrations such as spherical aberration, coma, and astigmatism.

Although the diffraction optical element has a sufficient chromatic aberration correction function, there is a problem in that diffraction light of an unnecessary diffraction order other than diffraction light of an actually used design diffraction order becomes color flare light, thereby deteriorating an imaging performance. According to a so-called stack type diffraction optical element in which a plurality of blaze type diffraction gratings are stacked in an optical axis direction, energy is concentrated on the design diffraction order to significantly reduce unnecessary diffraction light. However, when a high luminance subject is photographed, there still remains a problem in that diffraction flare appears.

A method of forming an ultraviolet curable resin or the like using a metal mold has been known as a method of manufacturing the diffraction optical element. However, the diffraction efficiency of the diffraction optical element is extremely sensitive for manufacturing condition thereof. Therefore, there is also a problem in that very high mold precision and formation precision are required, thereby increasing a manufacturing cost.

Because the material disclosed in U.S. Pat. No. 4,913,535 B is liquid, a structure for sealing the material is required. Therefore, it cannot be said that manufacturing is easy. Because there is also a problem that characteristics such as a refractive index and a dispersion characteristic depends on temperature, it cannot be said that an environmental resistance is sufficient. Further it is hard to obtain a sufficient chromatic aberration correction function because an interface with air is not obtained in addition that the Abbe number is relatively large, extraordinarys partial dispersion property is relatively small.

SUMMARY OF THE INVENTION

The present invention has been made in light of the above-mentioned problems of the conventional examples. An object of the present invention is to provide an optical system in which various aberrations including chromatic aberrations are preferably corrected and which is easily manufactured and has a superior environmental resistance.

In order to attain the above-mentioned object, according to an embodiment of the present invention, an optical system, includes a solid material whose incident and exiting surfaces of beam are refractive surfaces, in which following equations are satisfied:

$$\nu d < 30,$$

$$\theta gd < -3.333 \times 10^{-3} \cdot \nu d + 1.40,$$

$$\theta gF < -2.615 \times 10^{-3} \cdot \nu d + 0.67,$$

where $\nu d$ represents an Abbe number of the solid. material and $\theta gd$ and $\theta gF$ represent partial dispersion ratios thereof.

In the present invention, the Abbe number $\nu d$ and the partial dispersion ratios $\theta gd$ and $\theta gF$ are identical to those that are generally defined and used. Let Ng, NF, Nd, and NC be refractive indexes with respect to a g-line, an F-line, a d-line, and a C-line, respectively, the Abbe number $\nu d$ and the partial dispersion ratios $\theta gd$ and $\theta gF$ are expressed by the following expressions.

$$\nu d = (Nd-1)/(NF-NC)$$

$$\theta gd = (Ng-N)/(NF-NC)$$

$$\theta gF = (Ng-NF)/(NF-NC)$$

A solid material in the present invention indicates a solid material in which the optical system is used and thus does not indicate a state before the optical system is used, such as a state during manufacturing or the like. For example, even when a material is liquid during manufacturing, a solid material obtained by curing the liquid material corresponds to the solid material in the present invention.

BRIEF DESCRIPTION OF THE DRAWINGS

FIG. 7 is an aberration graph of the zoom lens at an intermediate focal length in a state focusing at infinity, according to Numerical Embodiment 3;

FIG. 8 is an aberration graph of the zoom lens at a telephoto end in a state focusing at infinity, according to Numerical Embodiment 3;

DETAILED DESCRIPTION OF THE PREFERRED EMBODIMENTS

Figure 1:
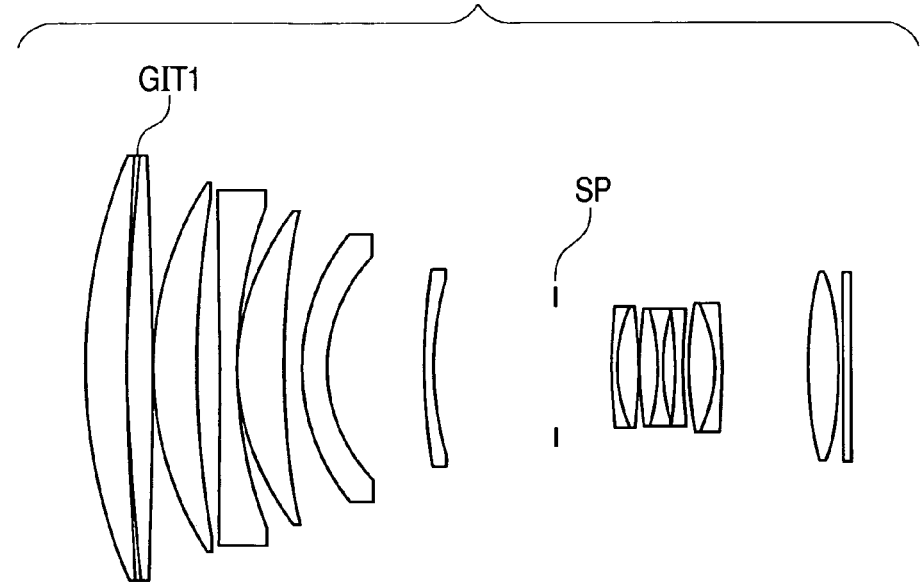
FIG. 1 is a sectional view showing an optical system of a telephoto lens according to Numerical Embodiment 1.

An optical system according to an embodiment of the present invention will be described. In the optical system of the present invention, a solid material having high dispersion and low partial dispersion ratios is provided with a refractive function.

First, the influence of a high dispersion optical material on aberration correction of the optical system will be described.

Assume that a change in optical power of a surface of a refractive lens is given by $\Delta\psi$, an Abbe number is given by $\nu$, and a distance between a point on the surface of the lens where a paraxial on-axis ray passes through and an optical axis, and a distance between a point on the surface of the lens where a pupil paraxial ray passes through and the optical axis are given by h and H, respectively. The paraxial on-axis ray can be defined as, with normalizing focal length of the entire optical system to be 1, a paraxial ray allowed to enter the optical system in a direction parallel to the optical axis with distant 1 apart from the optical axis. Assuming that an object be located on the left side of the optical system and a light beam incident on the optical system from the object side travel from the left to the right. The pupil paraxial ray can be defined as, with normalizing focal length of the entire optical system to be 1, a paraxial ray passing through an intersection of an entrance pupil of the optical system with the optical axis, of light beams incident on the optical system at −45° relative to the optical axis. For an incident angle on the optical system, assuming a clockwise direction relative to the optical axis be positive and a counterclockwise direction be negative. And assuming that the object be located on the left side of the optical system and a light ray incident on the optical system from the object side travel from the left to the right. A change in longitudinal chromatic aberration coefficient $\Delta L$ and a change in chromatic aberration of magnification coefficient $\Delta T$ on the surface of the lens are expressed by the following expressions.

$$\Delta L = h^2 \cdot \Delta\psi/\nu \quad (a)$$

$$\Delta T = h \cdot H \cdot \Delta\psi/\nu \quad (b)$$

As is apparent from the expressions (a) and (b), a change in each of the aberration coefficients which is caused according to a change in optical power on the surface of the lens increases as an absolute value of the Abbe number reduces (dispersion increases). Therefore, when a high dispersion material in which the absolute value of the Abbe number is small is used, a change in optical power for obtaining necessary chromatic aberrations can be reduced. This represents that the chromatic aberrations can be controlled without causing a large influence on spherical aberration, coma, astigmatism, and the like under an aberration theory, thereby improving the independence of chromatic aberration correction. Conversely, when a low dispersion material is used, a change in optical power for obtaining necessary chromatic aberrations becomes larger, so that various aberrations such as spherical aberration, coma, and astigmatism significantly change. Therefore, the independence of chromatic aberration correction weakens. Accordingly, it is important for aberration correction that at least one surface of lens of lenses composing the optical system is the refractive lens surface made of the high dispersion material.

Next, the effect of an optical material having low partial dispersion ratios on the aberration correction of the optical system will be described based on the high dispersion.

As has been well known, with respect to the dependency of a refractive index of an optical material on a wavelength (dispersion characteristic), the Abbe number indicates the gradient of the entire dispersion characteristic curve and the partial dispersion ratios indicate the degree of bend of the dispersion characteristic curve.

In general, with respect to the optical material, a refractive index on the short wavelength side is larger than a refractive index on the long wavelength side (Abbe number is a positive value). The dispersion characteristic curve is drawn in a convex shape downward (partial dispersion ratios each are a positive value). A change in refractive index which is caused due to a change in wavelength becomes larger as the wavelength shortens. In the high dispersion optical material, the partial dispersion ratios become larger as the Abbe number reduces. Therefore, the convex shape of the dispersion characteristic curve is likely to be emphasized to be convex downward.

In the case of an optical material having large partial dispersion ratios, a wavelength dependency curve of chromatic aberration coefficients of the surface of a lens made of the optical material exhibits a larger bend on the short wavelength side than that in the case where an optical material having small partial dispersion ratios is used. Here, when optical power of the surface of the lens is changed to control the chromatic aberrations, the entire gradient of the wavelength dependency curve of chromatic aberration coefficients changes about the position of a design reference wavelength as a rotational center. Such a change in the optical material having the large partial dispersion ratios becomes larger on particularly the short wavelength side than that in the optical material having the small partial dispersion ratios. In addition, the entire gradient changes while a bend amount significantly changes. As a result, even when a glass material of another refractive system portion is exchanged for another material, it is hard to cancel both entire gradient and bend of the wavelength dependency curve of chromatic aberration coefficients. Thus, the chromatic aberrations cannot be corrected over the entire wavelength region.

The cancellation will be described with reference to an example of achromatization for a super telephoto lens which is composed of a refractive optical system portion GIT made of a high dispersion material and a refractive optical system portion G other than the portion GIT.

In achromatization using the high dispersion optical material, relatively large chromatic aberration coefficients are cancelled out each other between the, portions GIT and G to obtain the chromatic aberrations of the entire system. Therefore, the chromatic aberrations of the portion G as a partial system are corrected up to a point. After that, a material having relatively high dispersion is selected for a positive lens composing the portion G. A material having relatively low dispersion is selected for a positive lens composing the portion G. Then, the entire gradient of the wavelength dependency curve of chromatic aberration coefficients in the portion G changes while the linearity becomes higher than that in an original state.

In such a state, suitable optical power is provided for the portion GIT to cancel the entire gradient of the wavelength dependency curve of chromatic aberration coefficients in the portion G. However, when the portion GIT is made of the optical material having the large partial dispersion ratios, the portion GIT has a larger bend in a reverse direction than the bend of the wavelength dependency curve of chromatic aberration coefficients in the portion G. As a result, even when the entire gradient component can be cancelled, the bend component cannot be cancelled.

In contrast to this, when the portion GIT is made of the optical material having the small partial dispersion ratios, the wavelength dependency curve of chromatic aberration coefficients in the portion GIT is relatively linear. Therefore, even when optical power is changed to control the chromatic aberrations, the gradient can be changed about the position of the design reference wavelength as the rotational center while a relative linear relationship is maintained. Thus, it is possible to relatively easily and simultaneously cancel the entire gradient component and bend component of the wavelength dependency curve of chromatic aberration coefficients in the portions GIT and G.

That is, it is also important that the portion GIT is made of the optical material having high dispersion and the small partial dispersion ratios. The following conditional expressions (1), (2), and (3) specified in the present invention express a relationship between the Abbe number and the partial dispersion ratios to preferably correct the chromatic aberrations based on the above-mentioned fundamental.

$$\nu d < 30 \tag{1}$$

$$\theta g d < -3.333 \times 10^{-3} \cdot \nu d + 1.40 \tag{2}$$

$$\theta g F < -2.615 \times 10^{-3} \cdot \nu d + 0.67 \tag{3}$$

where νd indicates the Abbe number of the refractive optical system portion (lens or layer) GIT, and is expressed by the following expression, $$\nu d = (Nd-1)/(NF-NC),$$

where Nd, NF, and NC represent refractive indexes with respect to a d-line, an F-line, and a C-line, respectively.

In addition, θgd and θgF indicate the partial dispersion ratios of the refractive optical system portion (lens or layer) GIT, and is expressed by the following expressions, $$\theta g d = (Ng-Nd)/(NF-NC),$$

$$\theta g F = (Ng-NF)/(NF-NC),$$

where Ng, NF, Nd, and NC represent refractive indexes with respect to a g-line, the F-line, the d-line, and the C-line, respectively.

When any one of the conditional expressions (1), (2), and (3) is not satisfied, it is hard to preferably correct the chromatic aberrations.

When the numerical range of the conditional expression (1) is set to the following range, an effect for independently correcting the chromatic aberrations is further improved. Therefore, a preferable optical performance can be obtained.

$$\nu d < 20 \tag{1a}$$

It is more desirable that the numerical range of the conditional expression (1) is set to the following range.

$$\nu d < 18 \quad (1b)$$

It is furthermore desirable that the numerical range of the conditional expression (1) is set to the following range.

$$\nu d < 16 \quad (1c)$$

It is still furthermore desirable that the numerical range of the conditional expression (1) is set to the following range.

$$\nu d < 14 \quad (1d)$$

When the numerical ranges of the conditional expressions (2) and (3) are set to the following ranges on the condition that any one of the conditional expressions (1), (1a), (1b), (1c), and (1d) is satisfied, a more preferable optical performance can be obtained.

$$\theta gd < -3.333 \times 10^{-3} \cdot \nu d + 1.30 \quad (2a)$$

$$\theta gF < -2.615 \times 10^{-3} \cdot \nu d + 0.59 \quad (3a)$$

It is more desirable that the numerical range of the conditional expressions (2) and (3) are set to the following ranges.

$$\theta gd < -3.333 \times 10^{-3} \cdot \nu d + 1.25 \quad (2b)$$

$$\theta gF < -2.615 \times 10^{-3} \cdot \nu d + 0.56 \quad (3b)$$

It is furthermore desirable that the numerical range of the conditional expressions (2) and (3) are set to the following ranges.

$$\theta gd < -3.333 \times 10^{-3} \cdot \nu d + 1.2375 \quad (2c)$$

$$\theta gF < -2.615 \times 10^{-3} \cdot \nu d + 0.55 \quad (3c)$$

It is still furthermore desirable that the numerical range of the conditional expressions (2) and (3) are set to the following ranges.

$$\theta gd < 1.1137 \quad (2d)$$

$$\theta gF < 0.47 \quad (3d)$$

With respect to a specific example of a solid optical material satisfying the expressions (1) to (3), there is a compound in which the following inorganic oxide fine particles are dispersed in a synthetic resin. That is, it is possible to use $TiO_2$ (nd=2.2652 and $\nu d$=11.8), $Nb_2O_5$ (nd=2.367 and $\nu d$=14.0), ITO (nd=1.8581 and $\nu d$=5.53), $Cr_2O_3$ (nd=2.2178 and $\nu d$=13.4), $BaTiO_3$ (nd=2.4362 and $\nu d$=11.3.), and the like.

Figure 13A:
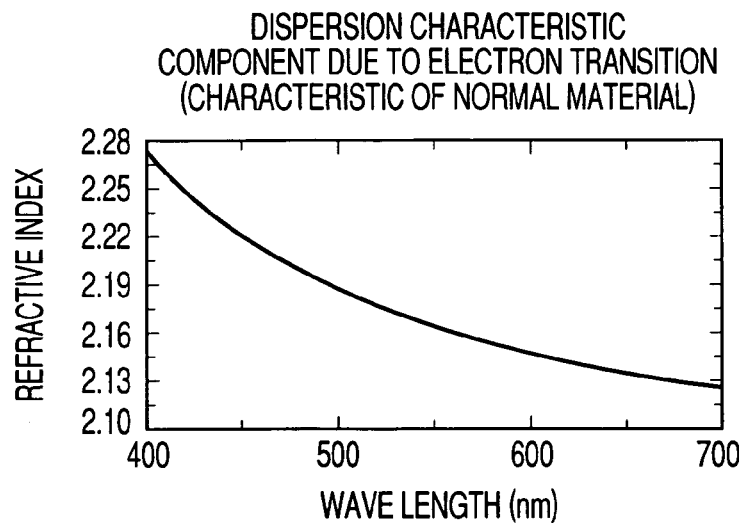
FIGS. 13A, 13B, and 13C are schematic explanatory graphs showing dispersion characteristics of an ITO.
Figure 13B:
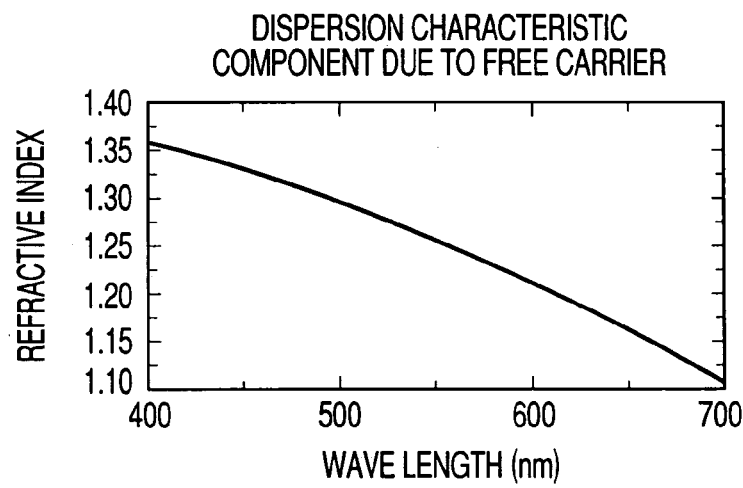
Figure 13C:
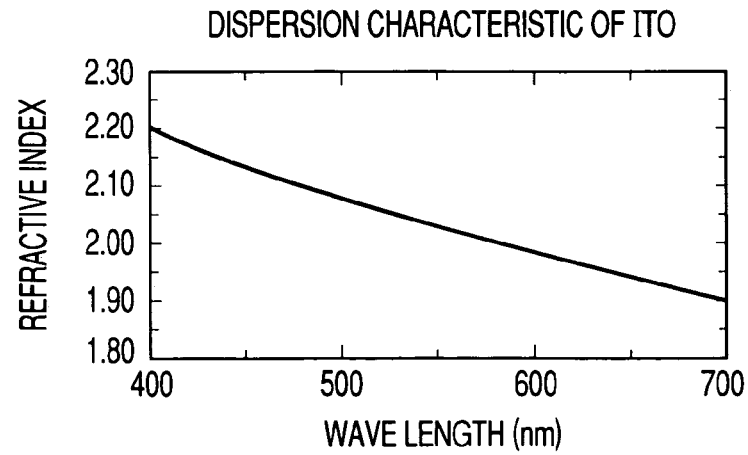

Of those materials, ITO (indium tin oxide) is preferable because it has particularly a smaller Abbe number than other materials. ITO is different from normal materials in that free carriers due to electroconductivity influence a refractive index. A dispersion characteristic of the ITO (FIG. 13C) is produced by combining a change in refractive index in a short wavelength region, which is caused due to normal electron transition (FIG. 13A), with refractive index dispersion in an infrared region which is caused by the free carriers (FIG. 13B). As a result, the dispersion characteristic has a wavelength dependency with an abnormally large gradient that the Abbe number is 5.53.

Refractive index dispersion due to the electron transition (FIG. 13A) significantly changes on the short wavelength side in the visible region. On the other hand, the refractive index dispersion caused due to the free carriers (FIG. 13B) significantly changes on the long wavelength side in the visible region. Therefore, the partial dispersion ratios become smaller than those in a normal case by a combination of the two significant changes.

As conceivable materials that are transparent and expected to be influenced by the free carriers, there are $SnO_2$, ATO ($SnO_2$ doped with antimony), ZnO, and the like.

The ITO is known as a material for forming a transparent electrode and generally used for a liquid crystal display element, an electroluminescent (EL) element, and the like. With respect to other applications, the ITO is used for an infrared shielding element and an ultraviolet shielding element. In the conventionally known applications of the ITO, its thickness is limited to a range of 50 nm to 500 nm. Therefore, there is no example in which the mixture of fine particles is used to correct the chromatic aberrations of the optical system.

An average diameter of the ITO fine particle is preferably about 2 nm to 50 nm in view of the influences of scattering and the like. A dispersant or the like may be added to the mixture in order to suppress aggregation.

A medium material for dispersing the ITO is preferably a monomer. High mass productivity can be obtained by photopolymerization formation or thermopolymerization formation using a mold or the like.

In view of characteristics of a monomer optical constant, it is preferable to use a monomer having a relatively small Abbe number, a monomer having relatively small partial dispersion ratios, and a monomer satisfying both, Such as N-polyvinylcarbazole, styrene, polymethyl methacrylate (acrylic), and the like. In embodiments described later, acrylic is used as the medium material for dispersing ITO fine particles. However, the present invention is not limited to acrylic.

A dispersion characteristic $N(\lambda)$ of a mixture in which nano-particles are dispersed can be simply calculated using the following expression derived from Drude's formula which is well known. That is, $$N(\lambda) = [1 + V\{N_{ITO}^2(\lambda) - 1\} + (1 - V)\{N_P^2(\lambda) - 1\}]^{1/2} \quad (e)$$

where $\lambda$ indicates an arbitrary wavelength, $N_{ITO}$ indicates a refractive index of ITO, $N_P$ indicates a refractive index of polymer, and V indicates a fraction of a total volume of ITO fine particles to a volume of polymer.

A proposal of this embodiment is to apply a material satisfying the conditional expressions (1) to (3) to a lens of the optical system and a layer provided on the surface of a lens. When a refractive surface made of the material is an aspherical surface, it is possible to correct chromatic aberration flare such as spherical aberration of color. When an interface is formed between the material and an atmosphere such as air or when an interface is formed between the material and a material having a relatively low refractive index, the chromatic aberrations can be relatively significantly changed by a slight change in curvature of the interface.

(Embodiments)

Embodiments in which a material satisfying the conditional expressions (1) to (3) is applied to specific optical systems will be described. Here, an ITO fine particle dispersion material is used as the material satisfying the conditional expressions (1) to (3).

Figure 2:
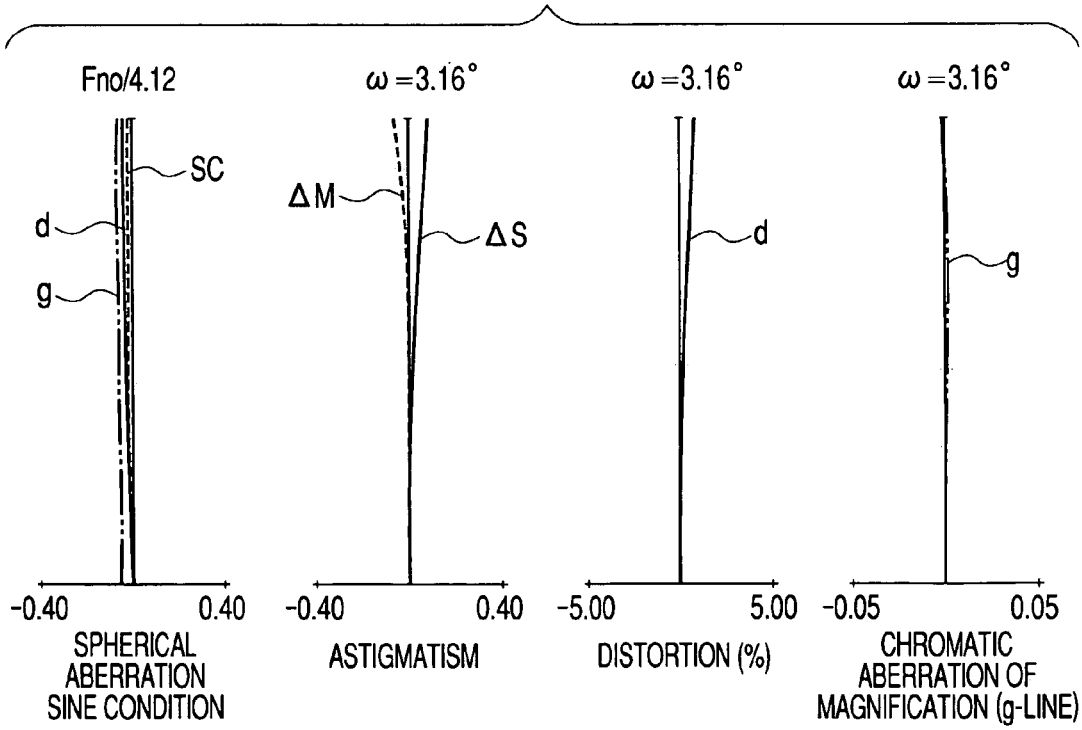
FIG. 2 is an aberration graph of the telephoto lens in a state focusing on infinity, according to Numerical Embodiment 1.

FIG. 1 is a sectional view showing an optical system according to Numerical Embodiment 1. In this example, a mixture of ITO fine particles is used for an ultra-telephoto lens having a focal length of 400 mm. In FIG. 1, a lens (layer) made of ITO is indicated by GIT1, and SP denotes an aperture stop. FIG. 2 is an aberration graph of the optical system in a state focusing at infinity, according to Numerical Embodiment 1. In FIG. 1, the left side is an object side (front) and the right side is an image side (rear). Such an arrangement is identical to that even in each of other numerical embodiments.

In the optical system according to Numerical Embodiment 1, ITO is introduced to a lens (layer) GIT1 located on the object side in which a distance between a passing position of a paraxial on-axis ray and the optical axis becomes relative long. Negative refractive power is provided for the lens (layer) GIT1, which is made of ITO, to mainly correct longitudinal chromatic aberration. As a result, a very compact ultra-telephoto lens having a telephoto ratio of 0.595 is obtained.

Figure 3:
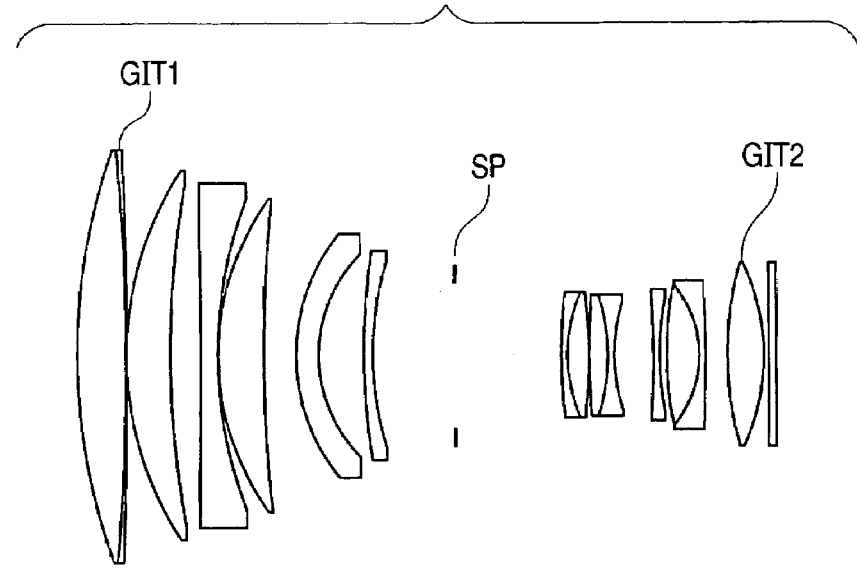
FIG. 3 is a sectional view showing an optical system of a telephoto lens according to Numerical Embodiment 2.
Figure 4:
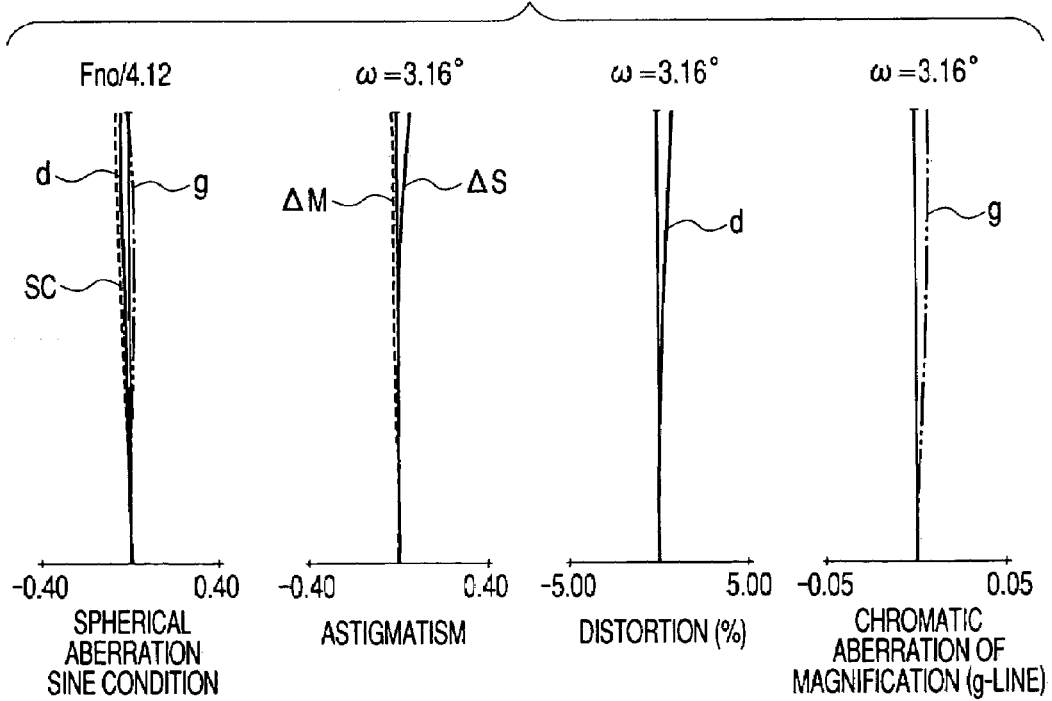
FIG. 4 is an aberration graph of the telephoto lens in a state focusing on infinity, according to Numerical Embodiment 2.

FIG. 3 is a sectional view showing an optical system according to Numerical Embodiment 2. In this example, a mixture of ITO fine particles is used for an ultra-telephoto lens having a focal length of 400 mm. In FIG. 3, lenses (layers) made of ITO are indicated by GIT1 and GIT2, and SP denotes an aperture stop. FIG. 4 is an aberration graph of the optical system in a state focusing at infinity, according to Numerical Embodiment 2.

In the optical system according to Numerical Embodiment 2, ITO is introduced to a lens (layer) GIT1 located on the object side in which a distance between a passing position of a paraxial on-axis ray and the optical axis becomes relative long and a lens (layer) GIT2 located closer to the image side than the aperture stop SP in which a distance between the passing position of the paraxial on-axis ray and the optical axis becomes relative short and a distance between a passing position of a pupil paraxial ray and the optical axis becomes relatively long. Negative refractive power and positive refractive power are provided for the lenses (layers) GIT1 and GIT2, respectively, which are made of ITO, to strongly correct longitudinal chromatic aberration and chromatic aberration of magnification. As a result, a very compact ultra-telephoto lens having a telephoto ratio of 0.573 is obtained.

Figure 5:
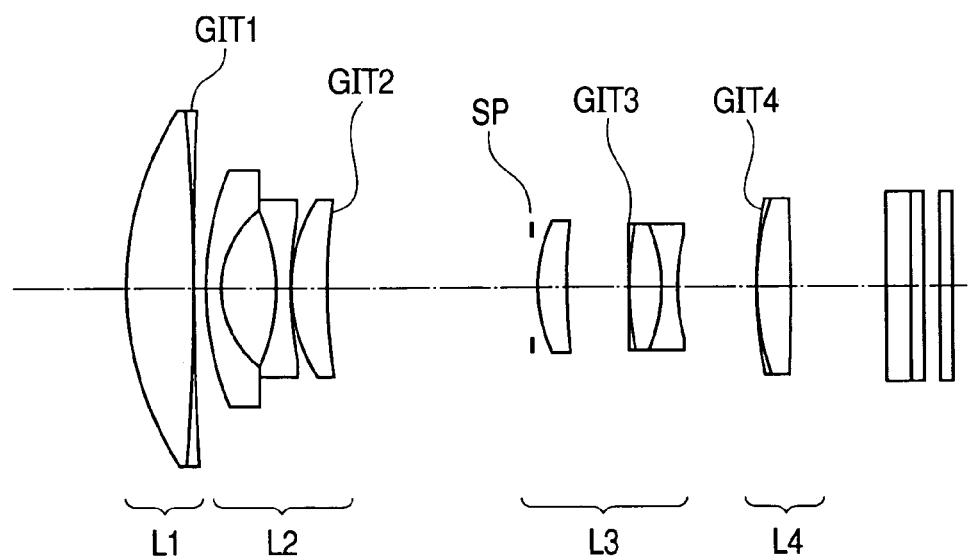
FIG. 5 is a sectional view showing an optical system of a zoom lens according to Numerical Embodiment 3.
Figure 6:
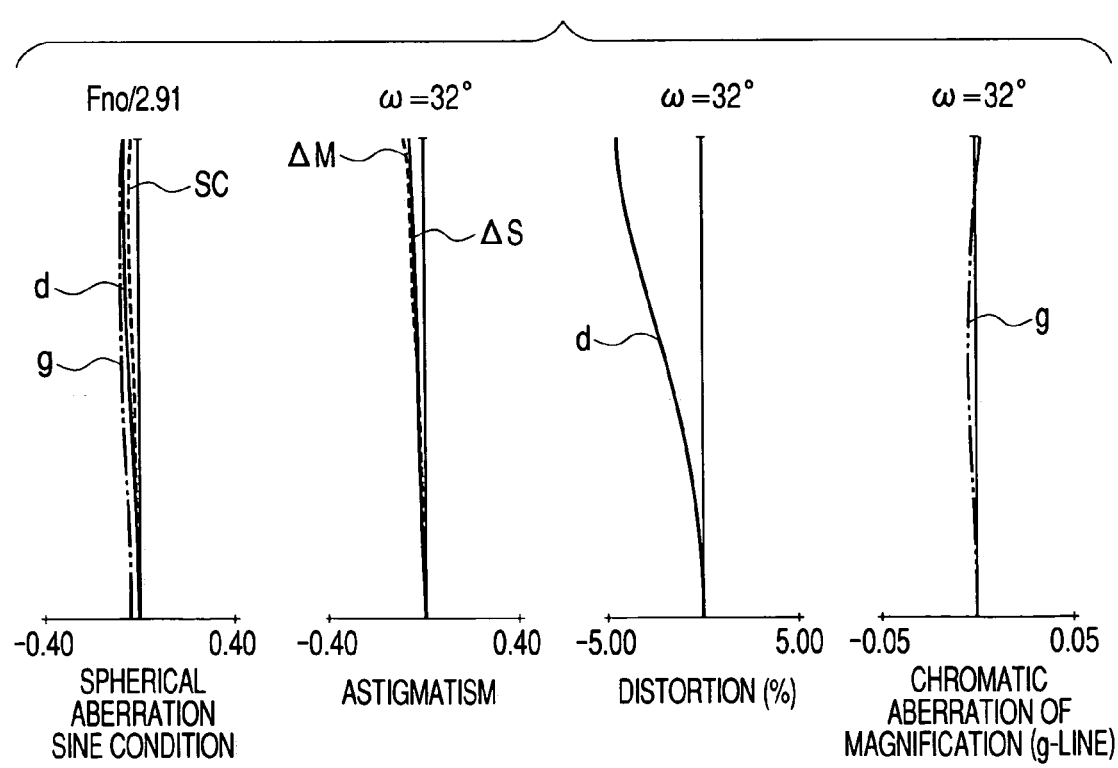
FIG. 6 is an aberration graph of the zoom lens at a wide angle end in a state focusing on infinity, according to Numerical Embodiment 3.

FIG. 5 is a sectional view showing an optical system according to Numerical Embodiment 3. In this example, a mixture of ITO fine particles is used for a zoom lens of a four-unit structure having a zoom ratio of 4. The zoom lens includes a first lens unit L1 having positive refractive power, a second lens unit L2 having negative refractive power, a third lens unit L3 having positive refractive power, and a fourth lens unit L4 having positive refractive power. In FIG. 5, lenses (layers) each made of ITO are indicated by GIT1 to GIT4, and SP denotes the aperture stop. FIGS. 6 to 8 are aberration graphs of the zoom lens (zoom lens) at a wide angle end, an intermediate focal length, and a telephoto end in a state focusing at infinity, according to Numerical Embodiment 3.

In the optical system according to Numerical Embodiment 3, ITO is introduced to the lenses of the respective lens units L1 to L4 composing the zoom lens. Optical power with sign opposite to the sign of the power of each of the lens units is provided for the corresponding lens (layer) made of ITO to reduce the chromatic aberrations of each of the lens units. Therefore, a compact optical system is achieved.

Figure 9:
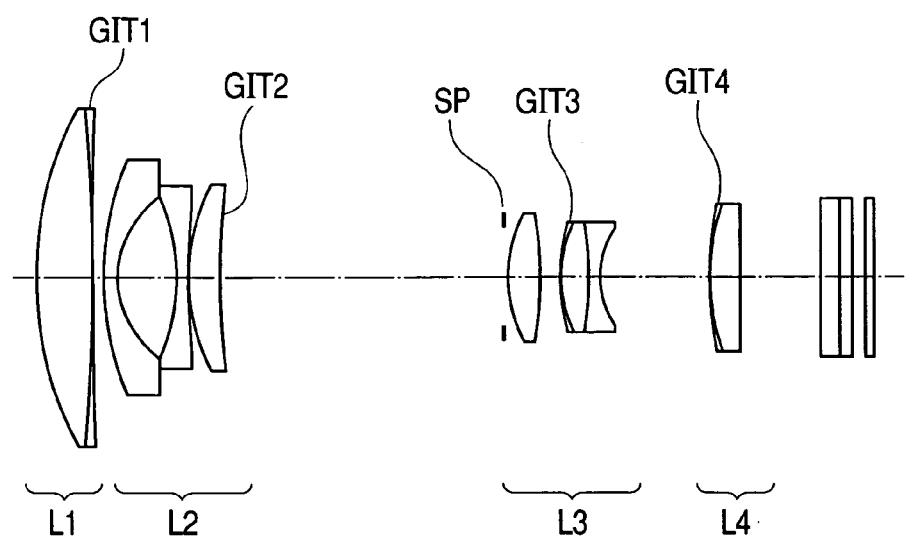
FIG. 9 is a sectional view showing an optical system of a zoom lens according to Numerical Embodiment 4.
Figure 10:
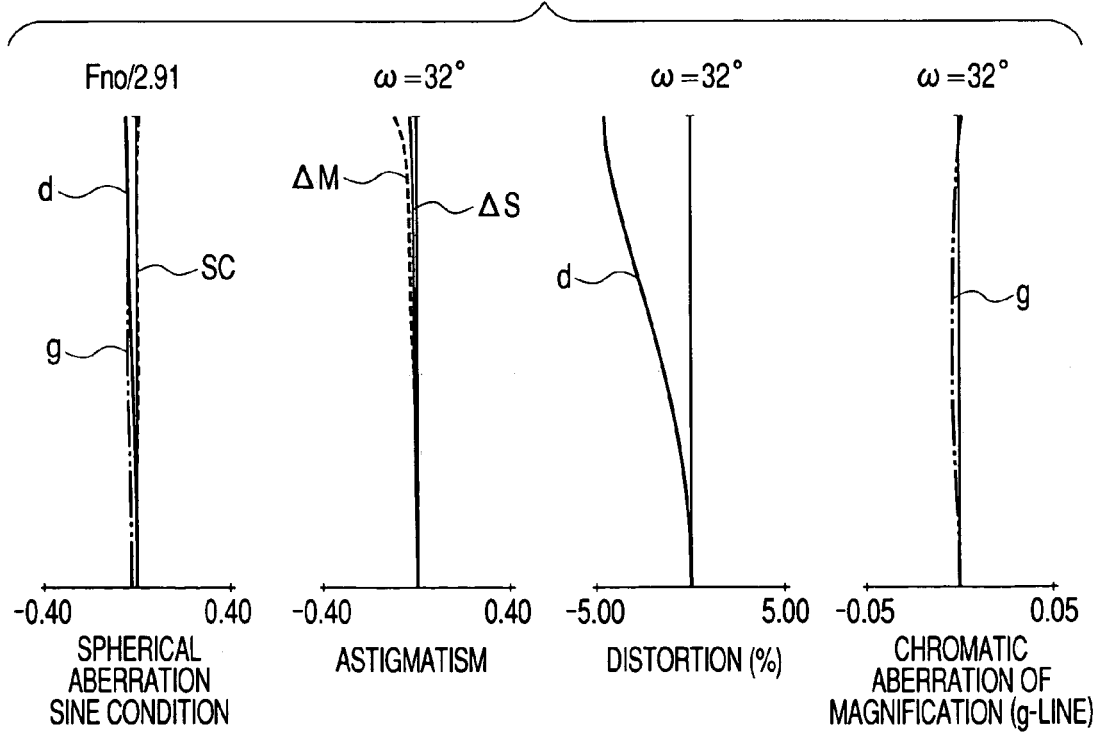
FIG. 10 is an aberration graph of the zoom lens at a wide angle end in a state focusing at infinity, according to Numerical Embodiment 4.
Figure 11:
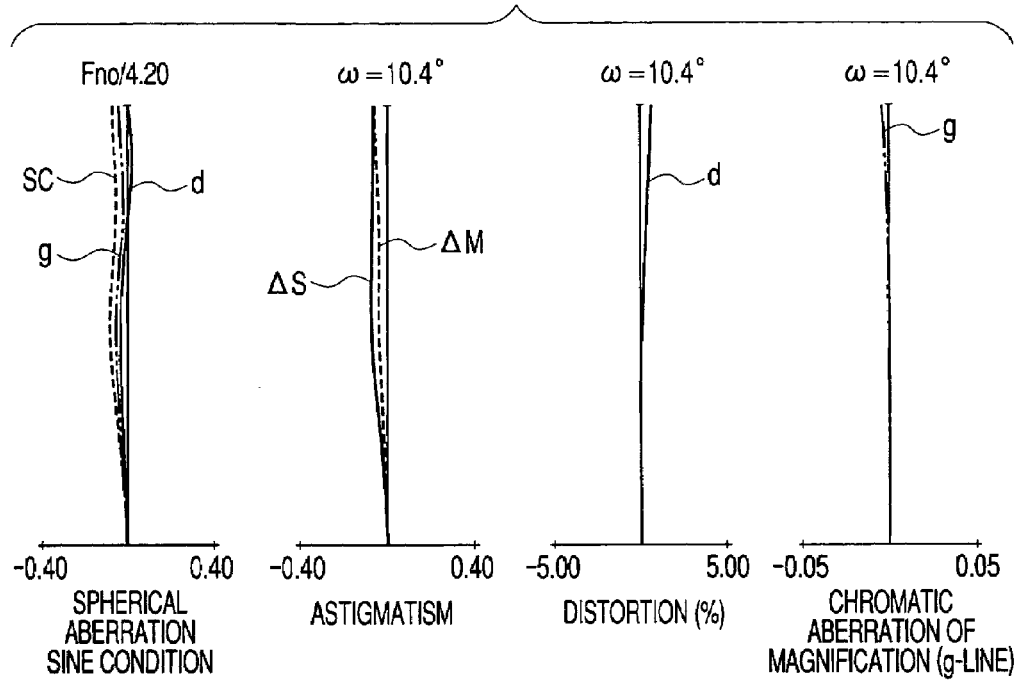
FIG. 11 is an aberration graph of the zoom lens at an intermediate focal length in a state focusing at infinity, according to Numerical Embodiment 4.
Figure 12:
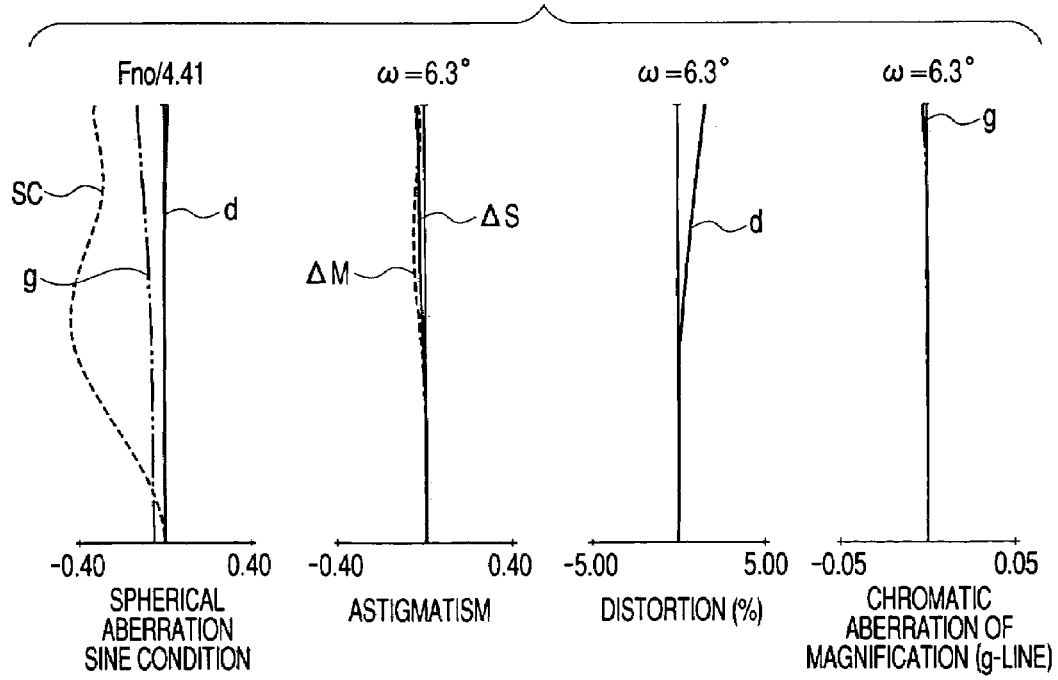
FIG. 12 is an aberration graph of the zoom lens at a telephoto end in a state focusing at infinity, according to Numerical Embodiment 4.

FIG. 9 is a sectional view showing an optical system according to Numerical Embodiment 4. In this example, a mixture of ITO fine particles is used for a zoom lens of a four-unit structure having a magnification of 6. The zoom lens includes a first lens unit L1 having positive refractive power, a second lens unit L2 having negative refractive power, a third lens unit L3 having positive refractive power, and a fourth lens unit L4 having positive refractive power. In FIG. 9, lenses (layers) each made of ITO are indicated by GIT1 to GIT4, and SP denotes the aperture stop. FIGS. 10 to 12 are aberration graphs of the zoom lens (zoom lens) at a wide angle end, an intermediate focal length, and a telephoto end in a state focusing at infinity, according to Numerical Embodiment 4.

In the optical system according to Numerical Embodiment 4, ITO is introduced to the lenses of the respective lens units L1 to L4 composing the zoom lens. Optical power with sign opposite to the sign of the optical power of each of the lens units is provided for the corresponding lens (layer) made of ITO to reduce the chromatic aberrations of each of the lens units. Therefore, a compact optical system can be achieved.

Hereinafter, specific numerical data in Numerical Embodiments 1 to 4 will be shown. In the respective numerical embodiments, "i" denotes an order counted from the object side, Ri denotes a curvature radius of an i-th optical surface (i-th surface), Di denotes an on-axis interval between the i-th surface and an (i+1)-th surface, Ni denotes a refractive index of a material of an i-th optical member (other than a lens (layer) made of a material different from the ITO fine particles dispersion material) based on the d-line, and vi denotes an Abbe number of the material of the i-th optical member based on the d-line. A refractive index of a lens GITj made of ITO based on the d-line and an Abbe number thereof are separately indicated by NGITj and vGITj (j=1, 2, . . . ), respectively. In addition, f denotes a focal length, Fno denotes an F number, and ω denotes a half view angle.

Let X be a displacement amount from a surface apex in the optical direction, h be a height from the optical axis in a direction perpendicular to the optical axis, r be a paraxial curvature radius, k be a conic constant, and B, C, D, E, . . . be aspherical coefficients at respective orders, an aspherical shape is expressed by the following expression.

$$x(h) = \frac{(1/r)h^2}{1+\sqrt{\{1-(1+k)(h/r^2)\}}} + Bh^4 + Ch^6 + Dh^8 + Eh^{10}\ldots$$

Note that "E±XX" in each of the aspherical coefficients indicates "$\times 10^{\pm XX}$".

A surface closest to the image side in each of the numerical embodiments (surface having an infinite curvature radius) corresponds to an inserted filter, an optical low pass filter, an infrared cut filter, or the like.

In the respective numerical embodiments, ITO is dispersed in acrylic (PMMA) with a volume fraction of 20%. A refractive index of a mixture of ITO and acrylic is calculated using a value calculated by the expression (C). Table 1 shows refractive indexes, Abbe numbers, and partial dispersion ratios for ITO, acrylic, and a mixture in which a volume mixing ratio of ITO fine particles to acrylic is set to 20% based on the d-line, the g-line, the C-line, and the F-line.

(Numerical Embodiment 1)

| | f = 391.93 | | Fno = 4.12 | | | 2ω = 6.32° | |
|---|---|---|---|---|---|---|---|
| R1 = | 122.617 | D1 = | 9.71 | N1 = | 1.86723 | ν1 = | 42.2 |
| R2 = | 661.755 | D2 = | 0.20 | NGIT1 = | 1.57159 | νGIT1 = | 13.5 |
| *R3 = | 406.479 (Aspheric surface) | D3 = | 6.11 | N2 = | 1.48700 | ν2 = | 70.4 |
| R4 = | −661.862 | D4 = | 0.15 | | | | |
| R5 = | 79.912 | D5 = | 10.07 | N3 = | 1.48700 | ν3 = | 70.4 |
| R6 = | 249.946 | D6 = | 5.36 | | | | |
| R7 = | −3949.515 | D7 = | 4.00 | N4 = | 1.86922 | ν4 = | 30.5 |
| R8 = | 111.753 | D8 = | 0.15 | | | | |
| R9 = | 62.093 | D9 = | 10.24 | N5 = | 1.48700 | ν5 = | 70.4 |
| R10 = | 226.601 | D10 = | 3.77 | | | | |
| R11 = | 52.863 | D11 = | 5.30 | N6 = | 1.88015 | ν6 = | 37.1 |
| R12 = | 37.793 | D12 = | 22.65 | | | | |
| R13 = | 219.518 | D13 = | 1.80 | N7 = | 1.43384 | ν7 = | 95.1 |
| R14 = | 73.014 | D14 = | 27.79 | | | | |
| R15 = | ∞ (Aperture stop) | D15 = | 12.76 | | | | |
| R16 = | 91.128 | D16 = | 1.30 | N8 = | 1.85000 | ν8 = | 23.0 |
| R17 = | 28.601 | D17 = | 4.87 | N9 = | 1.56522 | ν9 = | 42.2 |
| R18 = | −374.421 | D18 = | 0.30 | | | | |
| R19 = | 74.227 | D19 = | 4.34 | N10 = | 1.80488 | ν10 = | 24.2 |
| R20 = | −53.740 | D20 = | 1.30 | N11 = | 1.88500 | ν11 = | 41.0 |
| R21 = | 37.108 | D21 = | 3.12 | | | | |
| R22 = | −85.901 | D22 = | 1.30 | N12 = | 1.85887 | ν12 = | 42.7 |
| R23 = | 115.410 | D23 = | 1.60 | | | | |
| R24 = | 85.205 | D24 = | 5.77 | N13 = | 1.68713 | ν13 = | 29.3 |
| R25 = | −31.635 | D25 = | 1.40 | N14 = | 1.88500 | ν14 = | 41.0 |
| R26 = | −168.381 | D26 = | 20.24 | | | | |
| R27 = | 108.004 | D27 = | 6.92 | N15 = | 1.50200 | ν15 = | 61.5 |
| R28 = | −72.792 | D28 = | 1.00 | | | | |
| R29 = | ∞ | D29 = | 2.00 | N16 = | 1.51633 | ν16 = | 64.1 |
| R30 = | ∞ | | | | | | |

Aspherical coefficients

| | k | B | C | D | E |
|---|---|---|---|---|---|
| Third Surface | −2.717293E+00 | −6.524983E−09 | −6.404411E−13 | 6.251491E−17 | 1.220879E−19 |

(Numerical Embodiment 2)

| | F = 392.03 | | Fno = 4.12 | | | 2ω = 6.32° | |
|---|---|---|---|---|---|---|---|
| R1 = | 140.958 | D1 = | 11.87 | N1 = | 1.82075 | ν1 = | 45.8 |
| R2 = | −623.662 | D2 = | 0.20 | NGIT1 = | 1.57159 | νGIT1 = | 13.5 |
| *R3 = | −1545.484 (Aspheric surface) | D3 = | 0.15 | | | | |
| R4 = | 83.759 | D4 = | 10.44 | N2 = | 1.50885 | ν2 = | 68.1 |
| R5 = | 290.960 | D5 = | 7.10 | | | | |
| R6 = | −1470.450 | D6 = | 4.00 | N3 = | 1.84356 | ν3 = | 30.5 |
| R7 = | 113.299 | D7 = | 0.15 | | | | |
| R8 = | 67.327 | D8 = | 10.53 | N4 = | 1.48700 | ν4 = | 70.4 |
| R9 = | 354.463 | D9 = | 7.58 | | | | |
| R10 = | 46.347 | D10 = | 5.30 | N5 = | 1.77373 | ν5 = | 26.6 |
| R11 = | 35.325 | D11 = | 11.12 | | | | |
| R12 = | 260.607 | D12 = | 1.80 | N6 = | 1.43384 | ν6 = | 95.1 |
| R13 = | 79.619 | D13 = | 19.88 | | | | |
| R14 = | ∞ (Aperture stop) | D14 = | 25.15 | | | | |
| R15 = | 135.093 | D15 = | 1.30 | N7 = | 1.87172 | ν7 = | 31.8 |
| R16 = | 36.159 | D16 = | 5.15 | N8 = | 1.48700 | ν8 = | 70.4 |
| R17 = | −139.571 | D17 = | 0.30 | | | | |
| R18 = | 213.465 | D18 = | 4.57 | N9 = | 1.84915 | ν9 = | 23.0 |
| R19 = | −41.466 | D19 = | 1.30 | N10 = | 1.88500 | ν10 = | 41.0 |
| R20 = | 44.790 | D20 = | 9.44 | | | | |
| R21 = | −190.156 | D21 = | 1.30 | N11 = | 1.88500 | ν11 = | 41.0 |
| R22 = | 80.293 | D22 = | 1.60 | | | | |
| R23 = | 86.901 | D23 = | 7.91 | N12 = | 1.63906 | ν12 = | 32.8 |
| R24 = | −27.409 | D24 = | 1.40 | N13 = | 1.88500 | ν13 = | 41.0 |
| R25 = | −392.954 | D25 = | 5.18 | | | | |

-continued (Numerical Embodiment 2)

| | | | | | | | | |
|---|---|---|---|---|---|---|---|---|
| *R26 = | 67.383 | (Aspheric surface) | D26 = | 0.05 | NGIT2 = | 1.57159 | νGIT2 = | 13.5 |
| R27 = | 76.988 | | D27 = | 8.73 | N14 = | 1.51515 | ν14 = | 55.7 |
| R28 = | −52.893 | | D28 = | 1.00 | | | | |
| R29 = | ∞ | | D29 = | 2.00 | N15 = | 1.51633 | ν15 = | 64.1 |
| R30 = | ∞ | | | | | | | |

Aspherical coefficients

| | k | B | C | D | E |
|---|---|---|---|---|---|
| Third Surface | 1.961625E+02 | −9.401161E−09 | 1.032022E−13 | 6.250657E−17 | 5.916707E−21 |
| Twenty Sixth surface | −2.484499E+00 | −4.752855E−07 | −1.185466E−10 | 3.450231E−13 | −2.731250E−16 |

(Numerical Embodiment 3)

| | F = 7.22–17.49–27.06 | | Fno = 2.91–3.73–3.92 | | | 2ω = 63.9°–28.8°–18.9° | | |
|---|---|---|---|---|---|---|---|---|
| R1 = | 16.850 | | D1 = | 3.32 | N1 = | 1.64150 | ν1 = | 58.3 |
| R2 = | −139.734 | | D2 = | 0.05 | NGIT1 = | 1.57159 | νGIT1 = | 13.5 |
| *R3 = | −3211.428 | (Aspheric surface) | D3 = | Variable | | | | |
| R4 = | 16.608 | | D4 = | 0.75 | N2 = | 1.88500 | ν2 = | 41.0 |
| R5 = | 5.119 | | D5 = | 2.73 | | | | |
| R6 = | −10.086 | | D6 = | 0.70 | N3 = | 1.82097 | ν3 = | 45.8 |
| R7 = | 25.401 | | D7 = | 0.17 | | | | |
| R8 = | 9.912 | | D8 = | 1.59 | N4 = | 1.85715 | ν4 = | 25.3 |
| R9 = | 33.511 | | D9 = | 0.05 | NGIT2 = | 1.57159 | νGIT2 = | 13.5 |
| *R10 = | 1216.901 | (Aspheric surface) | D10 = | Variable | | | | |
| R11 = | ∞ | (Aperture stop) | D11 = | 0.24 | | | | |
| *R12 = | 7.838 | (Aspheric surface) | D12 = | 1.47 | N5 = | 1.84511 | ν5 = | 43.8 |
| R13 = | 68.783 | | D13 = | 3.10 | | | | |
| *R14 = | 24.968 | (Aspheric surface) | D14 = | 0.05 | NGIT3 = | 1.57159 | νGIT3 = | 13.5 |
| R15 = | 18.887 | | D15 = | 1.63 | N6 = | 1.77924 | ν6 = | 50.0 |
| R16 = | −7.624 | | D16 = | 0.75 | N7 = | 1.85000 | ν7 = | 23.0 |
| R17 = | 14.349 | | D17 = | Variable | | | | |
| *R18 = | 18.358 | (Aspheric surface) | D18 = | 0.05 | NGIT4 = | 1.57159 | νGIT4 = | 13.5 |
| *R19 = | 14.145 | (Aspheric surface) | D19 = | 1.74 | N8 = | 1.85388 | ν8 = | 24.2 |
| R20 = | −199.785 | | D20 = | Variable | | | | |
| R21 = | ∞ | | D21 = | 1.20 | N9 = | 1.51633 | ν9 = | 64.2 |
| R22 = | ∞ | | D22 = | 0.72 | N10 = | 1.55232 | ν10 = | 63.5 |
| R23 = | ∞ | | D23 = | 0.80 | | | | |
| R24 = | ∞ | | D24 = | 0.50 | N11 = | 1.50378 | ν11 = | 66.9 |
| R25 = | ∞ | | | | | | | |

| Variable | Focal length | | |
|---|---|---|---|
| interval | 7.22 | 17.49 | 27.06 |
| D3 | 0.60 | 4.96 | 8.87 |
| D10 | 10.23 | 2.67 | 1.34 |
| D17 | 3.86 | 5.21 | 10.10 |
| D20 | 4.70 | 10.12 | 9.08 |

Aspherical coefficients

| | k | B | C | D | E |
|---|---|---|---|---|---|
| Third Surface | −2.024392E+22 | 1.118695E−05 | 13.503961E−08 | −5.252088E−10 | 2.483281E−12 |
| Tenth Surface | −1.60922E+15 | 3.92987E−04 | −5.70929E−07 | 7.62621E−07 | −2.32104E−08 |
| Twelfth Surface | −2.40973E+00 | 6.43096E−04 | −3.00634E−06 | 4.12803E−07 | −1.64138E−08 |

-continued

|  | (Numerical Embodiment 3) | | | |
|---|---|---|---|---|
| Fourteenth Surface | −2.67342E+01 | −7.63833E−04 | −3.48992E−05 | 4.82542E−07 | −1.12429E−07 |
| Eighteenth Surface | 2.29377E+00 | 1.58598E−04 | −1.68138E−05 | 4.41247E−07 | −3.03243E−09 |
| Nineteenth Surface | −7.49797E+00 | −2.60615E−04 | 3.27338E−05 | −8.99287E−07 | 5.88968E−09 |

(Numerical Embodiment 4)

$f = 7.22–24.5–40.66$  $\text{Fno} = 2.91–4.20–4.41$  $2\omega = 63.9°–20.80°–12.6°$

| R1 = | 23.229 | D1 = | 3.33 | N1 = | 1.63733 | ν1 = | 58.7 |
|---|---|---|---|---|---|---|---|
| R2 = | −115.750 | D2 = | 0.05 | NGIT1 = | 1.57159 | νGIT1 = | 13.5 |
| *R3 = | −4474.963 (Aspheric surface) | D3 = | Variable | | | | |
| R4 = | 18.941 | D4 = | 0.75 | N2 = | 1.88500 | ν2 = | 41.0 |
| R5 = | 6.140 | D5 = | 3.55 | | | | |
| R6 = | −11.777 | D6 = | 0.70 | N3 = | 1.77430 | ν3 = | 50.2 |
| R7 = | 61.767 | D7 = | 0.12 | | | | |
| R8 = | 13.648 | D8 = | 1.68 | N4 = | 1.85000 | ν4 = | 23.0 |
| R9 = | 46.001 | D9 = | 0.05 | NGIT2 = | 1.57159 | νGIT2 = | 13.5 |
| *R10 = | 1925.768 (Aspheric surface) | D10 = | Variable | | | | |
| R11 = | ∞ (Aperture stop) | D11 = | 0.24 | | | | |
| *R12 = | 8.071 (Aspheric surface) | D12 = | 1.89 | N5 = | 1.59758 | ν5 = | 37.2 |
| R13 = | −28.398 | D13 = | 1.22 | | | | |
| *R14 = | 9.347 (Aspheric surface) | D14 = | 0.05 | NGIT3 = | 1.57159 | νGIT3 = | 13.5 |
| R15 = | 9.107 | D15 = | 1.63 | N6 = | 1.78000 | ν6 = | 50.0 |
| R16 = | −26.410 | D16 = | 0.75 | N7 = | 1.85000 | ν7 = | 23.0 |
| R17 = | 5.751 | D17 = | Variable | | | | |
| *R18 = | 20.828 (Aspheric surface) | D18 = | 0.05 | NGIT4 = | 1.57159 | νGIT4 = | 13.5 |
| *R19 = | 13.441 (Aspheric surface) | D19 = | 1.85 | N8 = | 1.71986 | ν8 = | 27.5 |
| R20 = | −157.047 | D20 = | Variable | | | | |
| R21 = | ∞ | D21 = | 1.20 | N9 = | 1.51633 | ν9 = | 64.2 |
| R22 = | ∞ | D22 = | 0.72 | N10 = | 1.55232 | ν10 = | 63.5 |
| R23 = | ∞ | D23 = | 0.80 | | | | |
| R24 = | ∞ | D24 = | 0.50 | N11 = | 1.50378 | ν11 = | 66.9 |
| R25 = | ∞ | | | | | | |

| Variable interval | Focal length | | |
|---|---|---|---|
| | 7.22 | 25.40 | 40.66 |
| D3 | 0.60 | 8.19 | 14.58 |
| D10 | 16.90 | 2.85 | 1.33 |
| D17 | 6.48 | 7.42 | 16.43 |
| D20 | 4.70 | 14.30 | 11.34 |

Aspherical coefficients

| | k | B | C | D | E |
|---|---|---|---|---|---|
| Third Surface | −2.024392E+22 | 2.943412E−06 | 3.453754E−08 | −3.601493E−10 | 1.430522E−12 |
| Tenth Surface | −1.60922E+15 | 1.25915E−04 | −1.22993E−06 | 1.90144E−07 | −3.11426E−09 |
| Twelfth Surface | −2.96160E+00 | 5.56632E−04 | −1.10254E−05 | 4.20652E−07 | −1.10624E−08 |
| Fourteenth Surface | −5.41148E−01 | −1.76849E−04 | 3.88219E−06 | −7.81247E−07 | 3.20961E−08 |
| Eighteenth Surface | −7.22712E−01 | 4.52890E−05 | −4.39659E−06 | 1.40067E−07 | −1.29251E−09 |
| Nineteenth Surface | −2.38712E+01 | 7.49915E−04 | −1.82994E−05 | 3.91744E−07 | −6.07532E−09 |

TABLE 1

|  | ITO | PMMA | ITO 20% Mixture |
|---|---|---|---|
| d-Line Refractive Index | 1.85710 | 1.49171 | 1.57159 |
| g-Line Refractive Index | 1.99250 | 1.50279 | 1.61267 |
| C-Line Refractive Index | 1.79800 | 1.48917 | 1.55583 |
| F-Line Refractive Index | 1.94870 | 1.49774 | 1.59815 |
| νd | 5.7 | 57.4 | 13.5 |
| θgd | 0.898 | 1.293 | 0.971 |
| θgF | 0.291 | 0.589 | 0.343 |

As described in those embodiments, it is possible to provide an optical system which is easily manufactured and has a superior environmental resistance and a high optical performance.

Next, a digital still camera using the optical system according to the embodiment of the present invention as an image taking optical system will be described with reference to FIG. 14.

Figure 14:
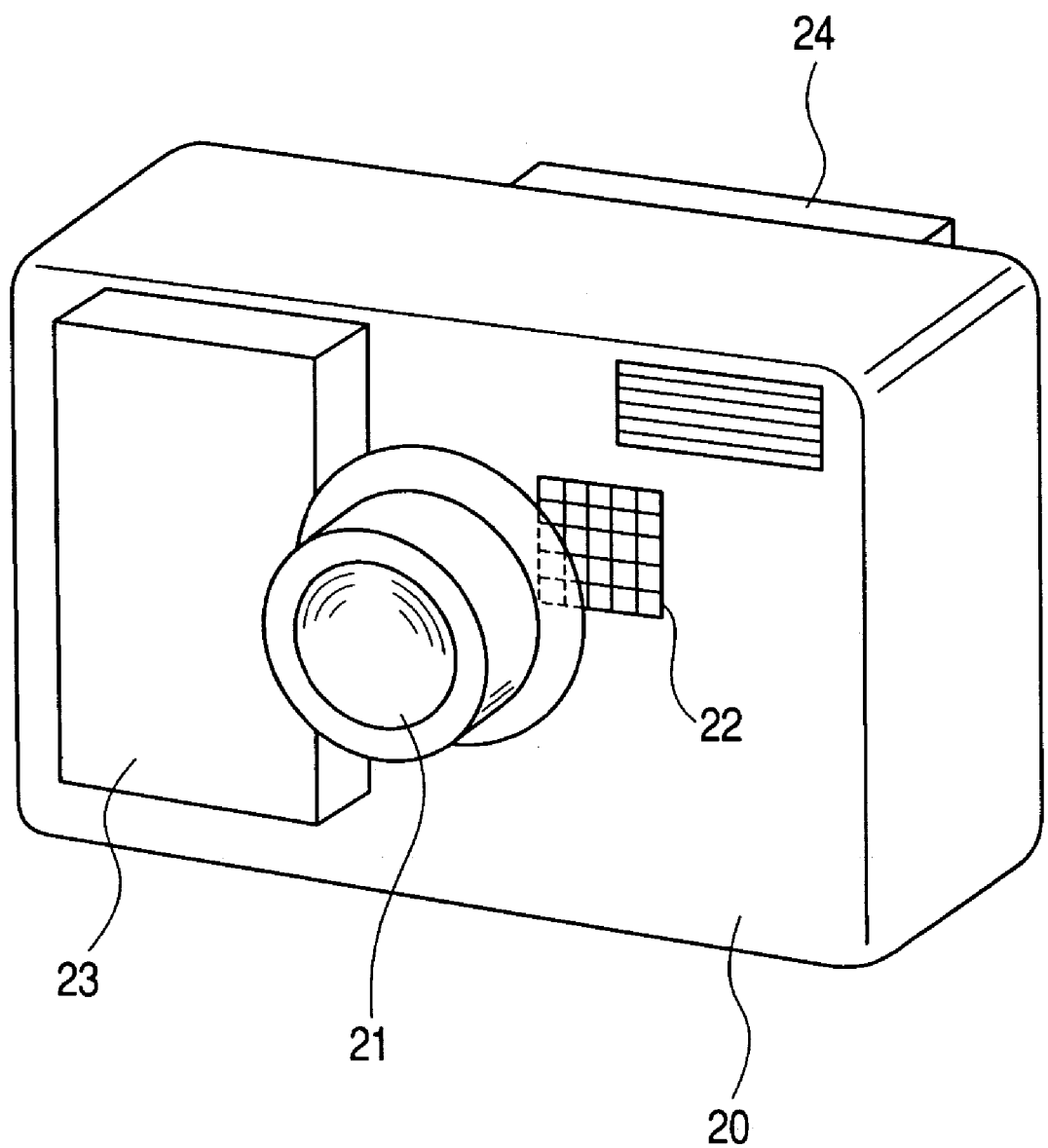
FIG. 14 is a schematic view showing an example of digital still camera using the optical system of the present invention as an image taking optical system.

In FIG. 14, the digital still camera includes a camera main body 20, an image taking optical system 21, a solid-state image pickup element (photoelectric transducer) 22 such as a CCD sensor or a CMOS sensor, a memory 23, and a finder 24. The image taking optical system 21 is the optical system of the present invention. The solid-state image pickup element 22 is incorporated in the camera main body 20 and receives a subject image formed by the image taking optical system 21. The memory 23 stores information corresponding to the subject image, which is photoelectrically converted by the solid-state image pickup element 22. The finder 24 is composed of a liquid crystal display panel and the like and used for observing the subject image formed on the solid-state image pickup element 22.

As described above, when the optical system of the present invention is applied to an image pickup device such as the digital still camera, it is possible to realize a compact image pickup device having a high optical performance.

This application claims priority from Japanese Patent Application No. 2003-417974 filed on Dec. 16, 2003, which is hereby incorporated by reference herein.

What is claimed is:

1. An optical system, comprising:
   a solid material having two surfaces both on a light incident side and on a light exit side being refractive surfaces,
   wherein following conditional expressions are satisfied:

$$\nu d < 30,$$

$$\theta gd < -3.333 \times 10^{-3} \cdot \nu d + 1.40,$$

$$\theta gF < -2.615 \times 10^{-3} \cdot \nu d + 0.67,$$

where νd represents an Abbe number of the solid material and θgd and θgF represent partial dispersion ratios thereof.

2. An optical system according to claim 1, wherein the solid material comprises a mixture in which inorganic fine particles are dispersed in a transparent medium.

3. An optical system according to claim 2, wherein the inorganic fine particle comprises fine particle of indium tin oxide.

4. An optical system according to claim 1, wherein the solid material is formed by one of photopolymerization or thermopolymerization using a mold.

5. An optical system according to claim 1, wherein at least one of the two refractive surfaces of the solid material is an aspherical surface.

6. An optical system according to claim 1, wherein at least one of the two refractive surfaces of the solid material is exposed to air.

7. An optical system according to claim 1, wherein the optical system forms an image on a photoelectric transducer.

8. An image pickup device, comprising:
   the optical system according to claim 1; and
   a photoelectric transducer for receiving an image formed by the optical system.

* * * * *

UNITED STATES PATENT AND TRADEMARK OFFICE
CERTIFICATE OF CORRECTION

PATENT NO. : 7,136,237 B2  Page 1 of 1
APPLICATION NO. : 10/994359
DATED : November 14, 2006
INVENTOR(S) : Hideki Ogawa It is certified that error appears in the above-identified patent and that said Letters Patent is hereby corrected as shown below:

COLUMN 2:
Line 5, "characteristic includes" should read --characteristics include--.

COLUMN 3:
Line 31, "N)" should read --Nd)--.

COLUMN 5:
Line 63, "the," should read --the--.

COLUMN 13:
Line 62, "13.503961E-08" should read --3.503961E-08--.

Signed and Sealed this

Thirtieth Day of October, 2007

JON W. DUDAS
*Director of the United States Patent and Trademark Office*